Nov. 25, 1969  P. O. TAUSON  3,479,872
CALORIMETER APPARATUS AND SYSTEM
Filed April 14, 1965  3 Sheets-Sheet 1

WITNESSES
Theodore F. Wrobel
James F. Young

INVENTOR
Peter O. Tauson
BY Zigmund L. Germer
ATTORNEY

United States Patent Office 3,479,872
Patented Nov. 25, 1969

3,479,872
CALORIMETER APPARATUS AND SYSTEM
Peter O. Tauson, Bradford Woods, Pa., assignor to Westinghouse Electric Corporation, Pittsburgh, Pa., a corporation of Pennsylvania
Filed Apr. 14, 1965, Ser. No. 448,127
Int. Cl. G01k 17/02
U.S. Cl. 73—192                    7 Claims

ABSTRACT OF THE DISCLOSURE

Calorimeter apparatus and method for determining the quality of a flowing vapor wherein measured amounts of heat are supplied to conduit means containing the vapor to dry and if desired to superheat the vapor. Inlet, outlet and if desired, intermediate temperatures along the conduit means are measured so that the vapor quality is determined without the necessity of flow measurements.

This invention relates, generally, to calorimeters and, more particularly, to calorimeters and systems for determining vapor quality.

Calorimeters of various types have been used for determining the quality, or moisture content, of a vapor, such as steam. These include mechanical separation of moisture, throttling, and the measurement of the total heat released by condensing the liquid in an ice bath or standard copper calorimeter. The common process of the above approaches, except possibly the mechanical separation, is that the measurements are made at a lower energy level than that of the initial condition. In the case of mechanical separation, the accuracy of the method is generally unsatisfactory unless the method is supplemented by a final step involving the throttling or cooling process.

Although throttling, with or without mechanical separation, is a fairly rapid method of evaluating the quality of a vapor, its use in alkali metal systems is not advisable since the expansion to atmosphere is undesirable because of the violent chemical reaction of alkali metal in contact with air which normally contains water vapor. The laboratory method of cooling a sample in an ice bath and determining the enthalpy, or heat content per unit mass, by measuring the total heat released and the final weight of the sample can be a very accurate method. However, it involves a considerable expenditure of time and painstaking labor. This method is impractical for rapid determination of the vapor quality of dynamic flow systems.

An object of this invention is to provide a continuous flow calorimeter suitable for measuring the quality of high temperature vapor of alkali metals, such as potassium, rubidium and cesium.

Another object of the invention is to provide a calorimeter that will operate satisfactorily in a vacuum chamber and function under zero gravity conditions.

A further object of the invention is to provide a calorimeter which can be operated within a closed fluid system without expanding the fluid sample to atmospheric or other lower than system pressure.

Still another object of the invention is to provide a calorimeter which is independent of mass flow.

Other objects of the invention will be explained fully hereinafter or will be apparent to those skilled in the art.

On accordance with the invention, a small continuous flow of vapor is tapped off the main stream and its energy is increased to measurable levels, first by heating the vapor until all the liquid is vaporized and slightly superheated, and then by increasing the energy further by superheating it a predetermined amount. The energy input ratio is a function of vapor quality and can be measured directly. The vapor may then be returned to the main stream by using the pressure drop normally provided by the difference between the total and static pressure of the main stream. Since the heat of evaporation and the heat of superheat are both a function of the mass flow, and since their ratio is used, this method is independent of the mass flow, thereby making the measurement of flow unnecessary. Known values of latent heat and specific heat of the vapor are utilized in determining the moisture content or vapor quality.

For a better understanding of the nature and objects of the invention, reference may be had to the following detailed description, taken in conjunction with the accompanying drawings, in which.

Figure 1:
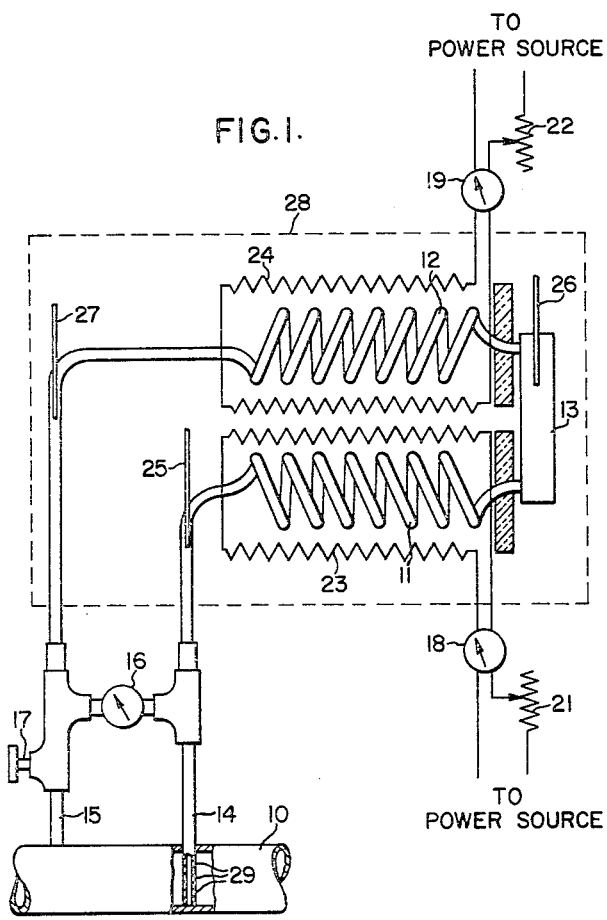
FIGURE 1 is a diagrammatic view of a calorimeter system embodying principal features of the invention.

Referring now to the drawings, particularly to FIG. 1, the calorimeter system shown therein comprises a main vapor conducting pipe 10, a drier conduit or coil 11, a super heater conduit or coil 12 connected in series with the coil 11 through an end connection 13, an inlet conduit 14, an outlet conduit, 15, a differential pressure gauge 16, a flow control valve 17, wattmeters 18 and 19, adjustable resistors 21 and 22, electrically energized heaters 23 and 24, temperature sensing devices, such as thermocouples 25, 26 and 27, and insulating material 28, such as asbestos, surrounding the coils 11 and 12 and the heaters 23 and 24. The vapor being tested flows through the pipe 10 in the direction indicated by the arrow and a sample of the vapor is bypassed, as shown by the arrows, through the calorimeter coils 11 and 12 in a closed system. Therefore, the system is suitable for testing the vapors of alkali metals, such as potassium, rubidium and cesium. The present system is also applicable to steam power plants, partciularly low pressure steam which cannot be analysed by a throttling calorimeter. A portion of the inlet conduit 14 disposed inside the pipe 10 contains a plurality of holes 29 to permit the vapor to enter the conduit 14. A single aperture probe may be used to explore the distribution of the liquid content of a vapor, both in axial and radial directions, thereby pinpointing the particular location where a local analysis is desirable.

As will be explained more fully hereinafter, the action of the present calorimeter is independent of the rate of flow of the vapor through the calorimeter. Therefore, the adjustment of the flow rate is not critical as long as it is within the thermal capacity of the instrument and does not result in excessive pressure drop. The valve 17 may be ultilized to adjust the flow rate to limit the pressure drop to a predetermined value as shown by the differential gauge 16. Because the calorimeter depends on a continuous flow, with the pressure field across the calorimeter supplying the motive force, its performance does not depend on the force of gravity. Therefore, it can be used in aggravic fields.

Figure 4:
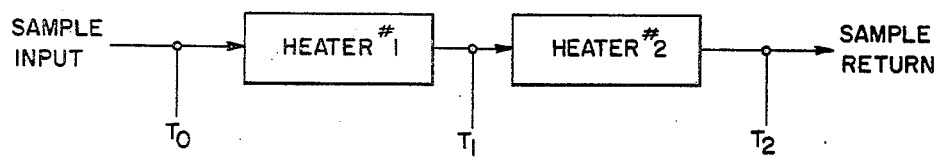
FIG. 4 is a block diagram of a basic calorimeter embodying the invention.
Figure 5:
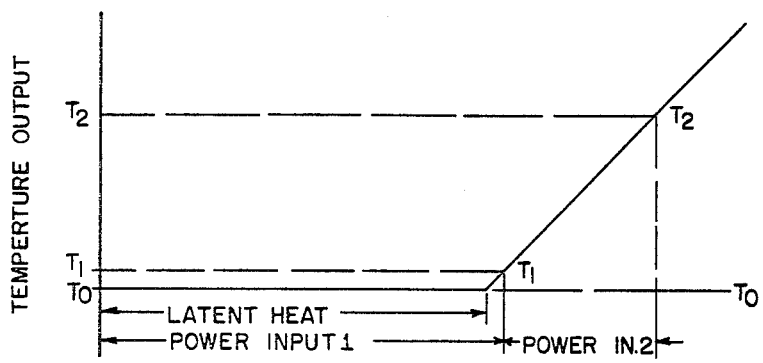
FIG. 5 is a graphic view showing the relation of variable quantities used in determining the moisture content or quality of a vapor.

FIG. 4 shows a block diagram of the basic calorimeter and the signals available for continuous operation. Heater No. 1 and heater No. 2 are the heater 23 and 24, respectively, in FIG. 1. $T_0$, $T_1$ and $T_2$ are the temperatures indicated by the thermocouples 25, 26 and 27, respectively, in FIG. 1. FIG. 5 shows the characteristics of the available signals.

In order to describe the operation of the calorimeter, the following definitions are given:

$X$ = vapor quality
$P_1$ = heat applied to drier coil
$P_2$ = heat applied to superheater coil
$T_0$ = wet vapor temperature at inlet
$T_1$ = vapor temperature between drier and superheater
$T_2$ = vapor temperature at outlet
$C_{pv}$ = specific heat of the vapor
$\lambda$ = latent heat (heat of evaporation) of the vapor.

For the drier coil:

(1) $\qquad P_1 = W(1-X)\lambda + WC_{pv}(T_1-T_0)$ where $(1-X)$ is the moisture content
$W$ is total weight of flow.

For the superheater coil:

(2) $\qquad P_2 = WC_{pv}(T_2-T_1)$

The ratio between the two is:

(3) $\qquad \dfrac{P_1}{P_2} = \dfrac{(1-X)\lambda}{C_{pv}(T_2-T_1)} + \dfrac{T_1-T_0}{T_2-T_1}$ (Note that $W$ cancels out)
Solving for moisture content:

(4) $\qquad (1-X) = \left[\dfrac{P_1}{P_2} - \dfrac{T_1-T_0}{T_2-T_1}\right]\dfrac{C_{pv}}{\lambda}(T_2-T_1)$ Since $(T_2-T_1)$ is considerably larger than $(T_1-T_0)$, Equation 4 can be simplified as follows for practical purposes:

(5) $\qquad 1-X = \dfrac{P_1}{P_2}\dfrac{C_{pv}}{\lambda}(T_2-T_1)$

Figure 6:
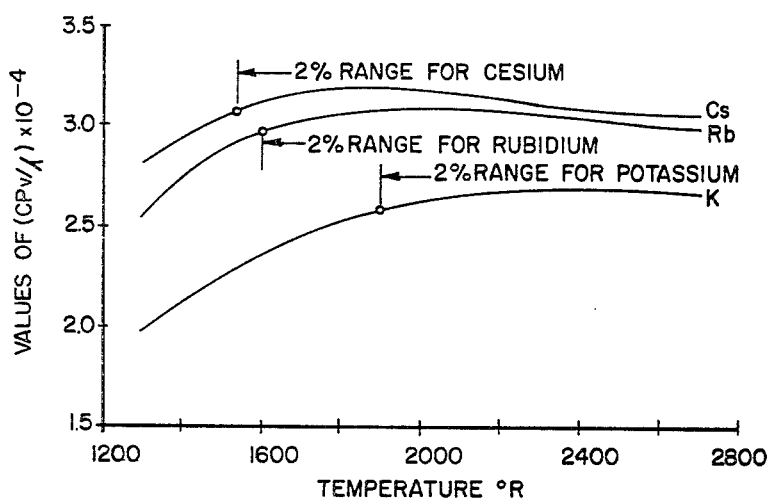
FIG. 6 is a graphic view showing general characteristics of three different alkali metals.

Of these quantities, $P_1$ and $P_2$ are directly measurable by the wattmeters 18 and 19 as the power input to the heaters $H_1$ and $H_2$, respectively. The temperatures $T_1$ and $T_2$ are directly obtainable from the system thermocouples 26 and 27. FIG. 6 shows the general characteristics of $C_{pv}/\lambda$ plotted against temperature for cesium (top curve), rubidium (center curve) and potassium (lower curve). At lower temperatures the values of $C_{pv}/\lambda$ tend to vary considerably, but all three curves flatten out at higher, more significant temperatures. Thus, the values can be assumed constant over a given range of temperatures. The quantity $(1-X)$ may be computed manually or by means of computer circuits well known in the art. If the characteristics of $C_{pv}/\lambda$ are known, the values of the vapor quality can be determined regardless of the shape of $C_{pv}/\lambda$ curve. $C_{pv}/\lambda$ does not have to be constant for the device to work. A constant $C_{pv}/\lambda$ just makes it more convenient.

Likewise, the calorimeter may be controlled manually or by means of automatic control circuits. The control system can be separated into two parts. The first has as its output the power applied to heated No. 1, thus controlling the amount of drying applied to the working fluid. This power is controlled by adjusting resistor 21 to maintain a fixed reference difference between $T_0$ and $T_1$. The second has as its output the power applied to heater No. 2, thus controlling the degree of superheat applied to the working fluid. The power of the second part of the control system is controlled either by maintaining a fixed reference difference between $T_1$ and $T_2$ or by maintaining a predetermined, fixed heater power.

Thus, it is seen that for a given fluid, the readings based on power ratio are independent of flow. The variation in power input for a given temperature rise $(T_2-T_1)$ is linear or calculable, and within certain temperature ranges the values of $C_{pv}/\lambda$ are constant.

Figure 7:
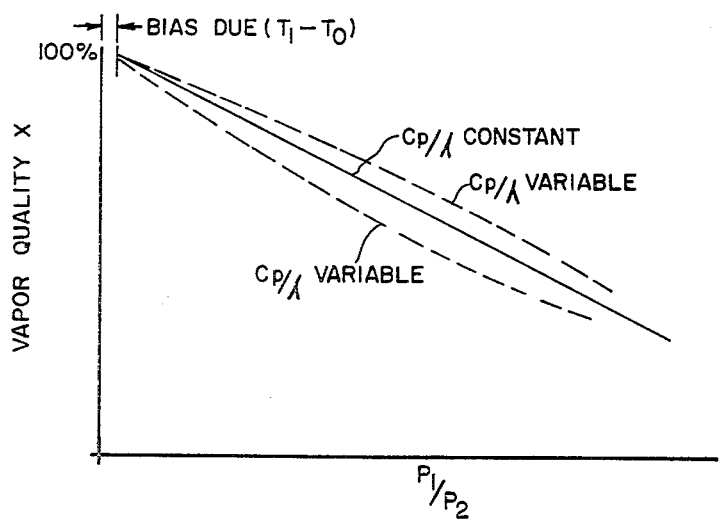
FIG. 7 is a graphic view showing the general relation between vapor quality and the ratio of measured heat inputs to the calorimeter.

The general relation between vapor quality $X$ and $P_1/P_2$ is shown by the curve in FIG. 7. Note that the curve has a negative slope, with $P_1/P_2$ being zero at 100% quality. For $C_p/\lambda$ constant, the curve is a straight line as shown by the solid line. For $C_p/\lambda$ variable, the curve may assume shapes shown by dotted lines. The variations may be a series of straight lines, dependent on inlet temperature, or curved lines. The general picture is, however, a line with a negative slope and very small curvature which may be approximate by a straight line without significant error.

When the calorimeter is insulated, as shown in FIG. 1, with a large amount of insulating material, the combined effects of insulation and heat inertia are objectionable because of the prolonged time required for initial stabilization. This can be overcome by providing the calorimeter shown in FIG. 2 which substantially reduces the heat loss and the heat inertia of the system.

Figure 2:
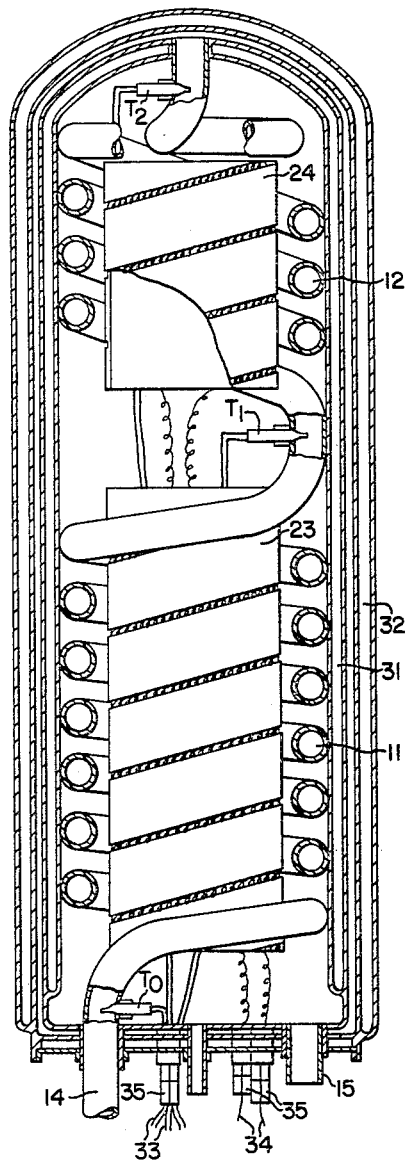
FIG. 2 is a view, partly in section, and partly in elevation, of a structural embodiment of the invention.

As shown in FIG. 2, the coils are surrounded by two nested vacuum bottles 31 and 32 with the discharge fluid flowing between the two bottles as shown by the arrows. Thermocouple leads 33 and power leads 34 are brought out through fittings 35 at the bottom of the bottles. The leads may be connected to control an indicating apparatus of the type shown in FIG. 1.

Figure 3:
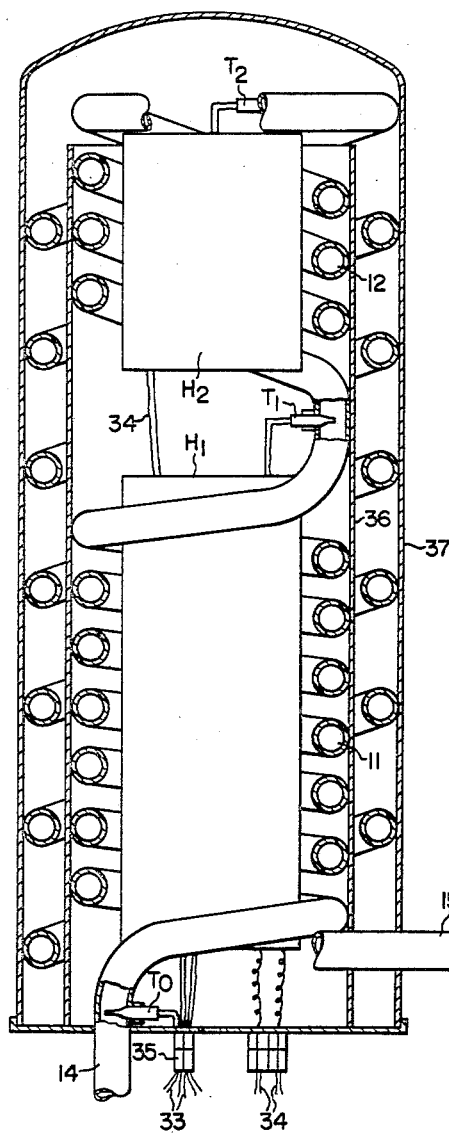
FIG. 3 is a view, similar to FIG. 2, of another embodiment of the invention.

When the calorimeter is to be operated in a vacuum, the two vacuum bottles surrounding the coils can be replaced by heat reflectors 36 and 37 as shown in FIG. 3.

A reduction of heat leak in the calorimeter is accomplished by a return coil jacket 38 shown in FIG. 3. The heaters $H_1$ and $H_2$ of FIG. 3 are illustrated as tubular metal members formed from a suitable material such as an alloy of tantalum which are energized by leads 34.

The important heat loss for the vacuum environment configuration is the heat leak out of the jacket to the environment. This heat leak should be approximately the same as the calorimeter heat input, so that the quality of the returned vapor will be approximately the same as the initial vapor quality. Since only a small percent of the total vapor is used, a slight error in the quality of vapor returned will be further reduced by dilution in the main stream to a value well within the required accuracy of measurement for most conditions of test, even for a relatively small flow of the test system.

From the foregoing it is apparent that vapor quality can be determined by using the ratio of two accurately measured heats ($P_1$, required to dry "wet" vapor and $P_2$, required to achieve superheat) and known values of latent heat and specific heat of the vapor. If the ratio of specific heat to latent heat is not known, it can be determined by utilizing a calorimeter of the same general type as the one herein described in conjunction with a flow meter for measuring the flow of vapor through the calorimeter.

While the calorimeter is herein described as having two series-connected coils or conduits it is not limited to the use of two coils, but a third coil may be used to assure that the equilibrium of superheat has been reached and that all of the liquid is vaporized as manifested by a zero temperature difference across an unheated coil.

Likewise, an additional coil following the superheat coil may be used to assure that a temperature equilibrium has been reached in the stream as manifested by zero temperature across the coil.

The heat additive calorimeter herein described is particularly suitable for measuring the quality of alkali metal vapors, such as potassium vapor. The calorimeter operates in a closed system and is suitable for continuous flow operation. It may be controlled and read manually or by means of automatic control and readout systems. It is relatively simple in construction and may be economically manufactured and installed.

Since numerous changes may be made in the above-described construction, and different embodiments of the invention may be made without departing from the spirit and scope thereof, it is intended that all the matter contained in the foregoing description or shown in the accompanying drawings shall be interpreted as illustrative and not in a limiting sense.

I claim:

1. Calorimeter apparatus comprising conduit means forming a plurality of series-connected passageway means, means for causing a vapor to flow through the passageway means, heating means for applying heat to at least one of said passageway means to heat the vapor as it flows through said one or more passageway means, means for separately measuring the quantity of heating power applied to said one passageway means, and temperature sensing means for determining the temperature of the vapor respectively at the inlet to the first passageway means and at the end of each passageway means.

2. The apparatus of claim 1 wherein said passageway means and said heating means are located in a tubular insulating container.

3. The apparatus of claim 1 including a pair of spaced nested vacuum bottles receiving said passageway means therein, conduit means connecting the outlet of said passageway means to the space between said nested bottles and conduit means for removing the outlet flow from said space.

4. Calorimeter apparatus comprising two series-connected coils, means for causing a vapor to flow through the coils, heating means for applying heat to the coils to heat the vapor as it flows through the coils, means for separately measuring the quantity of heating power applied to each one of the coils, and temperature sensing means located at the inlet to the first coil and between the two coils and at the outlet from the second coil for determining the temperature of the vapor at each one of said locations.

5. The apparatus of claim 2 wherein said coils are coaxially arranged and wherein said heating means are substantially surrounded by said coils.

6. In a calorimeter system, in combination, a vapor conducting pipe, a first coil and a second coil connected in series and connected to the pipe in a closed system to cause a sample of the vapor to flow through the coils, heating means for applying heat to the first coil to evaporate moisture from the vapor, means for measuring the quantity of heating power applied to the first coil, additional heating means for applying heat to the second coil to superheat the vapor, additional means for measuring the quantity of heating power applied to the second coil, and temperature sensing means for determining the vapor temperature at the inlet to the first coil and between the coils and at the outlet of the second coil.

7. In a calorimeter system, in combination, a vapor conducting pipe, a first coil and a second coil connected in series and connected to the pipe in a closed system to cause a sample of the vapor to flow through the coils, electrically energized heating means for applying heat to the first coil to evaporate moisture from the vapor, means for measuring the quantity of electrical power supplied to the heating means, additional electrically energized heating means for applying heat to the second coil to superheat the vapor, additional means for measuring the quantity of electrical power supplied to the additional heating means, and temperature sensing means for determining differential temperatures between said coils.

References Cited

UNITED STATES PATENTS

| 898,610 | 9/1908 | Thomas | 73—192 |
|---|---|---|---|
| 1,193,488 | 8/1916 | Thomas | 73—192 XR |
| 3,167,957 | 2/1965 | Ziyiani | 73—193 |

FOREIGN PATENTS

| 1,032,530 | 5/1964 | Great Britain. |
|---|---|---|

JAMES J. GILL, Primary Examiner